(12) United States Patent
Allard et al.

(10) Patent No.: US 8,176,746 B2
(45) Date of Patent: *May 15, 2012

(54) VACUUM FOOD PRESERVATION SYSTEM

(75) Inventors: Paul B. Allard, Stevensville, MI (US);
Douglas D. Leclear, Benton Harbor, MI (US); Karen J. Querfurth, Coloma, MI (US); Andrew M. Tenbarge, Saint Joseph, MI (US); John J. Vonderhaar, Saint Joseph, MI (US); Michele E. Wilcox, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 309 days.

This patent is subject to a terminal disclaimer.

(21) Appl. No.: 12/402,559

(22) Filed: Mar. 12, 2009

(65) Prior Publication Data

US 2009/0229224 A1 Sep. 17, 2009

Related U.S. Application Data

(60) Provisional application No. 61/035,775, filed on Mar. 12, 2008.

(51) Int. Cl.
*F25B 19/00* (2006.01)

(52) U.S. Cl. .......................................... 62/268; 62/449

(58) Field of Classification Search ................ 62/268, 62/100, 169, 449; 312/405.1, 404; 53/510, 53/532

See application file for complete search history.

(56) References Cited

U.S. PATENT DOCUMENTS

| | | | |
|---|---|---|---|
| 5,048,269 A | 9/1991 | Deni | |
| 5,513,480 A | 5/1996 | Tsoi | |
| 6,256,968 B1 | 7/2001 | Kristen | |
| 6,467,242 B1 | 10/2002 | Huang | |
| 6,694,710 B2 | 2/2004 | Wang | |
| 7,003,928 B2 | 2/2006 | Patterson et al. | |
| 7,040,074 B2 | 5/2006 | Knowlton et al. | |
| 7,076,929 B2 | 7/2006 | Patterson et al. | |
| 7,146,783 B2 | 12/2006 | Levsen et al. | |
| 7,197,861 B2 | 4/2007 | Higer et al. | |
| 7,231,753 B2 | 6/2007 | Patterson et al. | |
| 7,331,163 B2 | 2/2008 | Hau et al. | |
| 7,469,553 B2 * | 12/2008 | Wu et al. .......................... | 62/344 |

(Continued)

FOREIGN PATENT DOCUMENTS

KR 20010084303 A 9/2001

(Continued)

*Primary Examiner* — Mohammad Ali
(74) *Attorney, Agent, or Firm* — Kirk W. Goodwin; Price Heneveld, LLP

(57) ABSTRACT

A refrigerator includes a cabinet defining an open storage space and including a door with an exterior side and an interior side adapted to receive a modular component. The modular component includes a base removably connected to the interior side and has a first edge and a second edge. A component door is hingedly-connected to the first edge of the base and is operable between an open position and a closed position. The base and component door define a sealed compartment when the component door is in the closed position. First fasteners are disposed on the component door, and second fasteners are disposed on the base. The second fasteners engage the first fasteners to create an airtight seal between the component door and the base. A vacuum device is in communication with the sealed compartment and a heat sealer is disposed on the base or the component door.

18 Claims, 9 Drawing Sheets

U.S. PATENT DOCUMENTS

| | | | |
|---|---|---|---|
| 7,472,974 B2 * | 1/2009 | Czach et al. | 312/405.1 |
| 7,748,805 B2 * | 7/2010 | Lucas et al. | 312/405.1 |
| 7,826,203 B2 * | 11/2010 | McCoy | 361/679.01 |
| 7,870,753 B2 * | 1/2011 | Marcy et al. | 62/331 |
| 2004/0004421 A1 * | 1/2004 | Han | 312/404 |
| 2006/0010829 A1 * | 1/2006 | de Sa Cavalcanti et al. | 52/784.1 |
| 2006/0086132 A1 * | 4/2006 | Maglinger et al. | 62/344 |
| 2006/0086135 A1 * | 4/2006 | Wu et al. | 62/351 |
| 2006/0196213 A1 * | 9/2006 | Anderson | 62/344 |
| 2007/0119807 A1 * | 5/2007 | Benz et al. | 211/184 |
| 2007/0159041 A1 * | 7/2007 | Lucas et al. | 312/408 |

FOREIGN PATENT DOCUMENTS

| | | |
|---|---|---|
| KR | 20020035332 A | 5/2002 |
| KR | 0405381 A | 1/2006 |
| KR | 20070121252 A | 12/2007 |

* cited by examiner

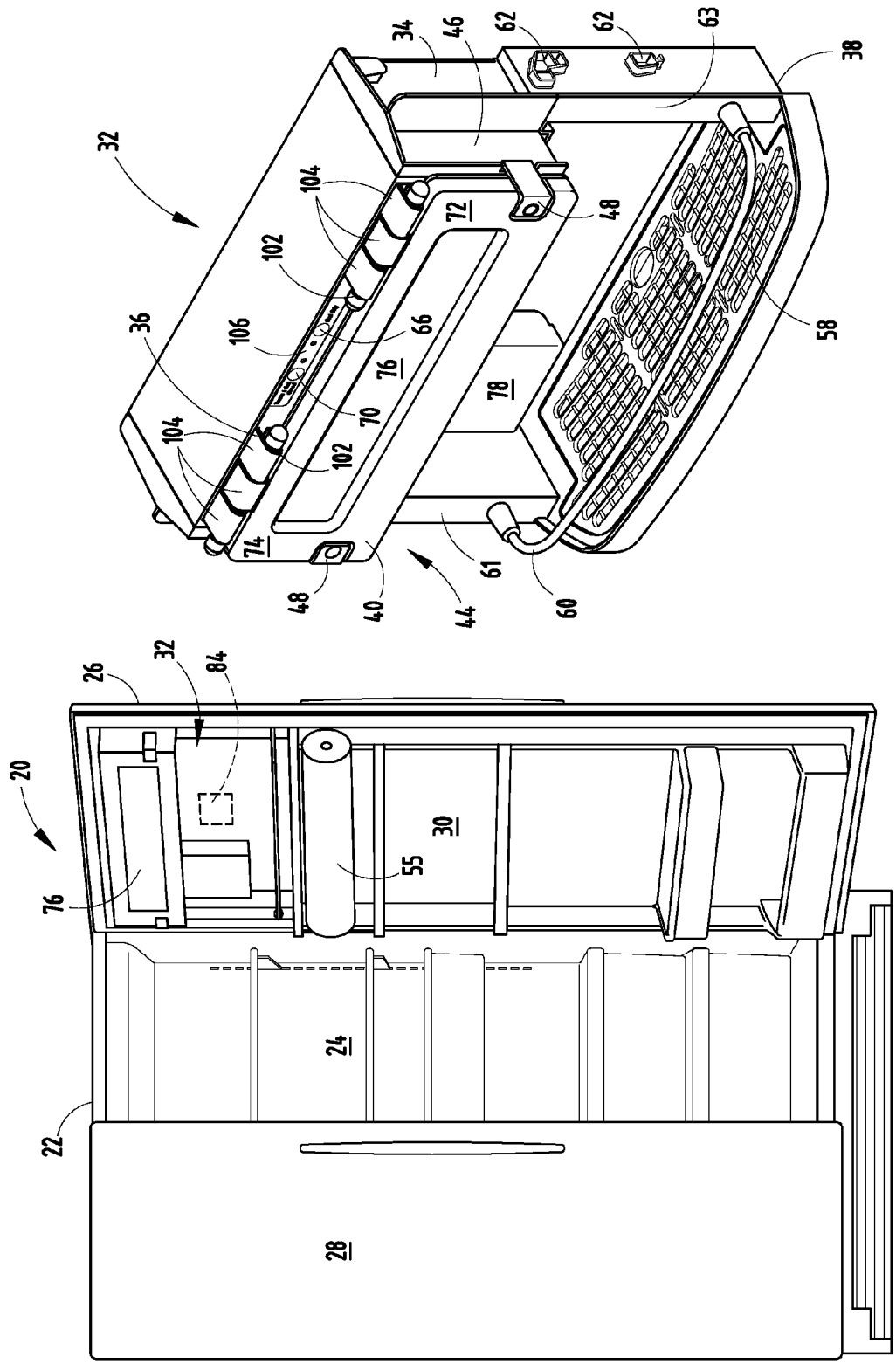

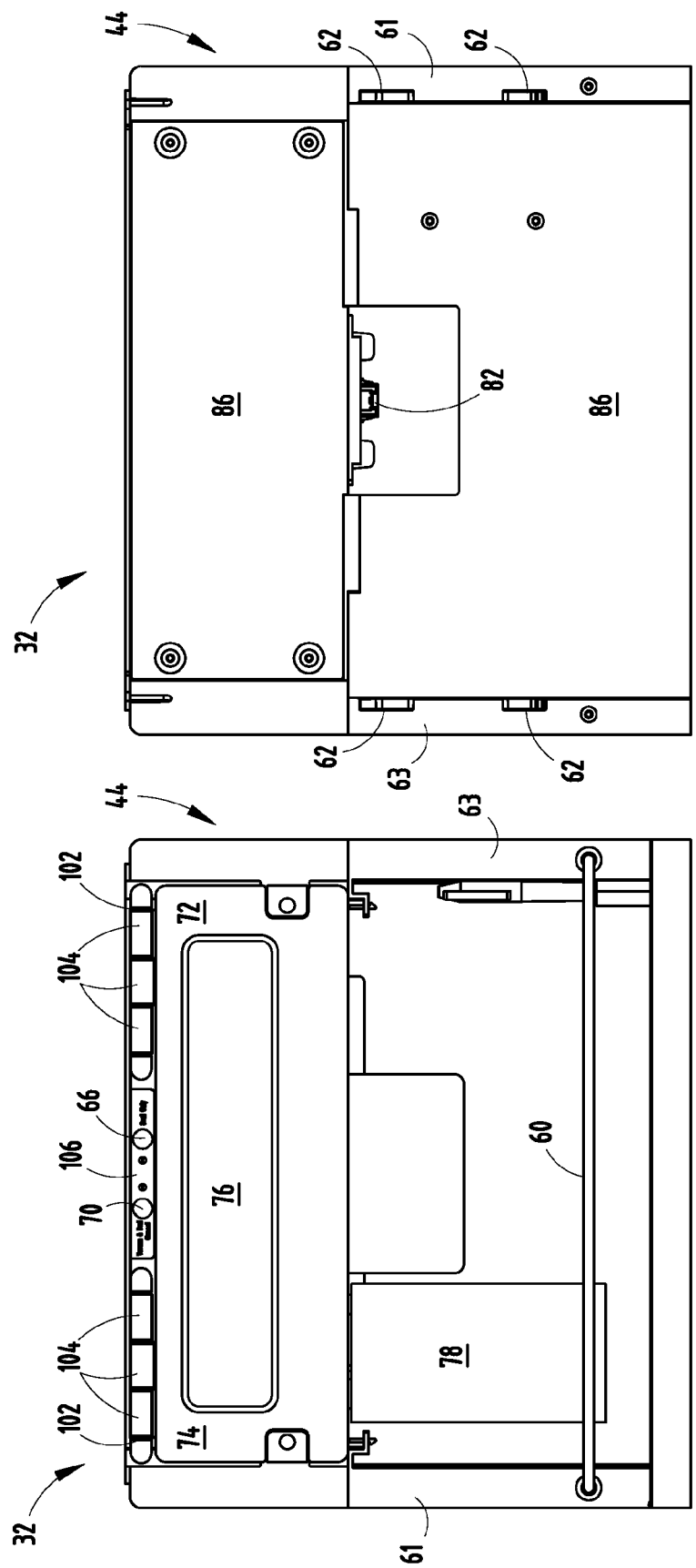

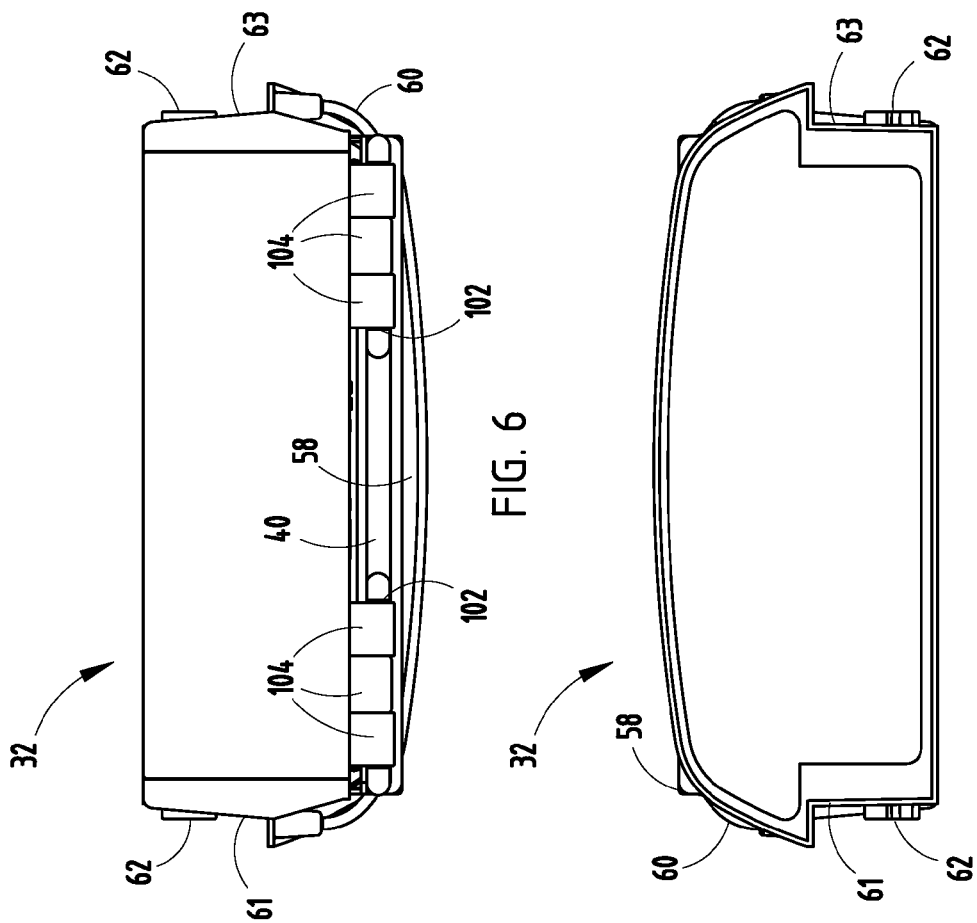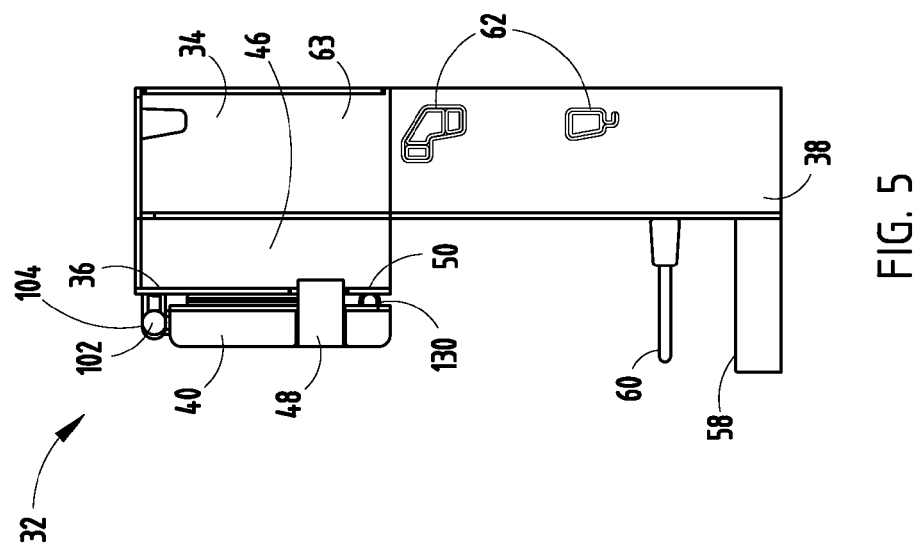

VACUUM FOOD PRESERVATION SYSTEM

CROSS-REFERENCE TO RELATED APPLICATIONS

This application claims priority under 35 U.S.C. §119(e) to U.S. Provisional Patent Application No. 61/035,775, entitled "REFRIGERATOR WITH SPACE MANAGEMENT MODULES," filed on Mar. 12, 2008, the entire disclosure of which is hereby incorporated herein by reference.

BACKGROUND OF THE PRESENT INVENTION

The present invention generally relates to a food preservation system, and more specifically, to a modular low profile food preservation system.

SUMMARY OF THE INVENTION

In one aspect of the present invention, a refrigerator includes a cabinet defining an open storage space and including a door with an exterior side and an interior side adapted to receive a modular component. The modular component includes a base removably connected to the interior side of the door and having a first edge and a second edge. A component door is hingedly-connected to the first edge of the base. The component door is operable between an open position and a closed position. The base and component door define a sealed compartment when the component door is in the closed position. First fasteners are disposed on the component door, and second fasteners are disposed on the base and are adapted to engage with the first fasteners to create an airtight seal between the component door and the base. A vacuum device is in communication with the sealed compartment and a heat sealer is disposed on one of the base and the component door.

In another aspect of the present invention, a vacuum sealing module for an appliance includes a base removably connected to an interior side of an appliance door. A component door is hingedly-connected to the base and has first connectors and a translucent portion, the component door being operable between an open position and a closed position. The base and component door define a sealed compartment when the component door is in the closed position. First fasteners are disposed on the base and are adapted to detachably connect with complementary second fasteners on the component door. A vacuum device is in communication with the sealed compartment and is formed when the second member is in the second closed position. A suction hose is in communication with the sealed compartment. A heat sealer is disposed on one of the component door and the base, and a bumper is disposed on the other of the component door and the base, opposite the heat sealer.

In another aspect of the present invention, a method of vacuum sealing an item includes providing a refrigerator having module receiving connectors on an interior portion of the refrigerator. A vacuum sealing module is provided with a base. The base of the vacuum sealing module is removably connected to the module receiving connectors of the refrigerator. A component door is hingedly connected to the base. The component door is operable between an open position and a closed position. The base and the component door define a sealed compartment when the component door is in the closed position. A vacuum device is provided and is connected with the sealed compartment formed when the component door is in the closed position. A heat sealer is connected to one of the component door and the base. A bumper is connected to the other of the component door and the base opposite the heat sealer.

These and other features, advantages and objects of the present invention will be further understood and appreciated by those skilled in the art upon studying the following specification, claims, and appended drawings.

BRIEF DESCRIPTION OF THE DRAWINGS

FIG. 1 is a front elevational view of a refrigerator incorporating a food preservation system of the present invention;

FIG. 2 is a top perspective view of one embodiment of the food preservation system of the present invention;

FIG. 3 is a front elevational view of the food preservation system of FIG. 2;

FIG. 4 is a rear elevational view of the food preservation system of FIG. 2;

FIG. 5 is a side elevational view of the food preservation system of FIG. 2;

FIG. 6 is a top elevational view of the food preservation system of FIG. 2;

FIG. 7 is a bottom elevational view of the food preservation system of FIG. 2;

DETAILED DESCRIPTION OF EMBODIMENTS

For purposes of description herein the terms "upper," "lower," "right," "left," "rear," "front," "vertical," "horizontal," and derivatives thereof shall relate to the invention as oriented in FIGS. 1 and 2. However, it is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1A:
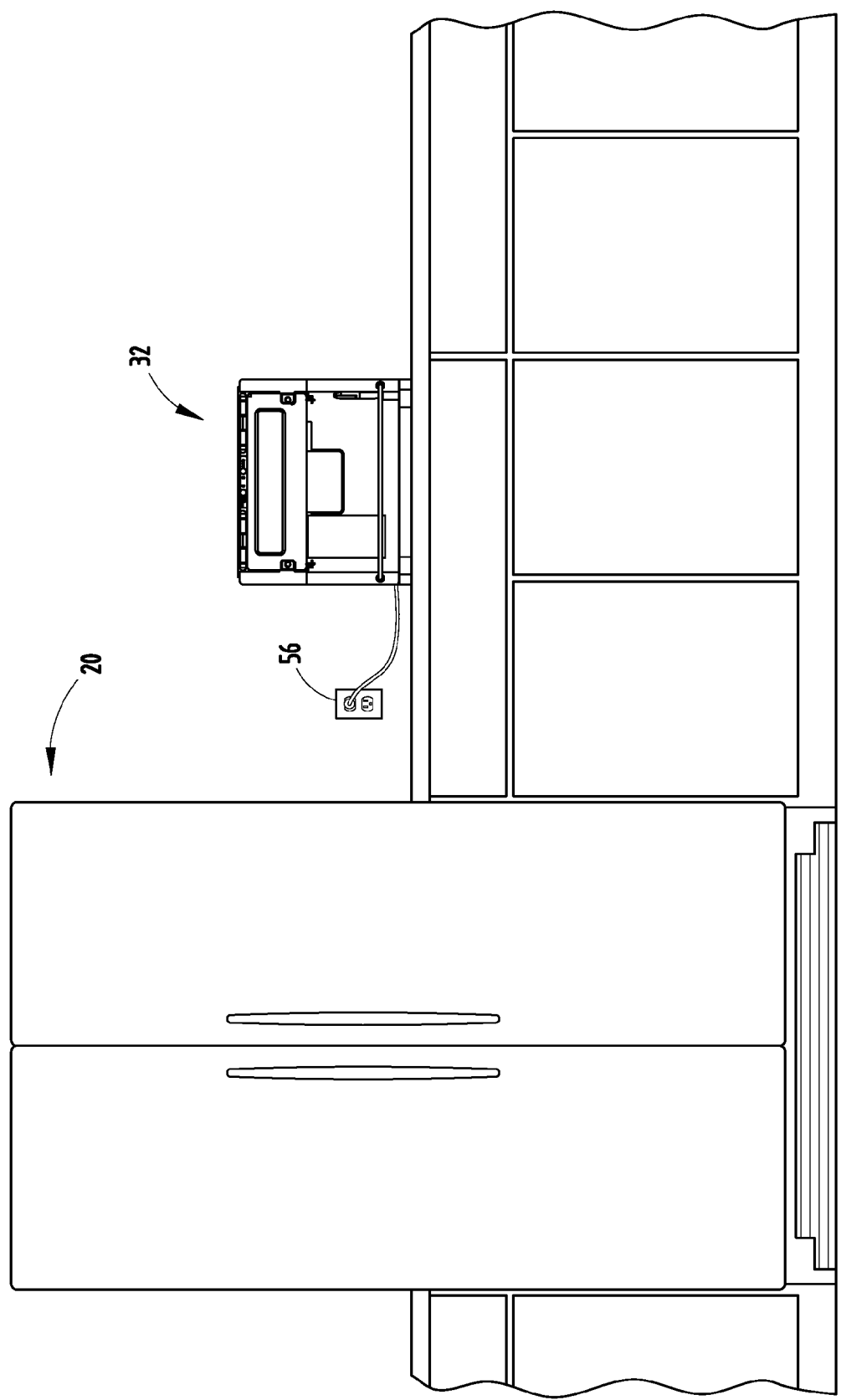
FIG. 1A is a front elevational view of the food preservation system removed from the refrigerator.
Figure 8:
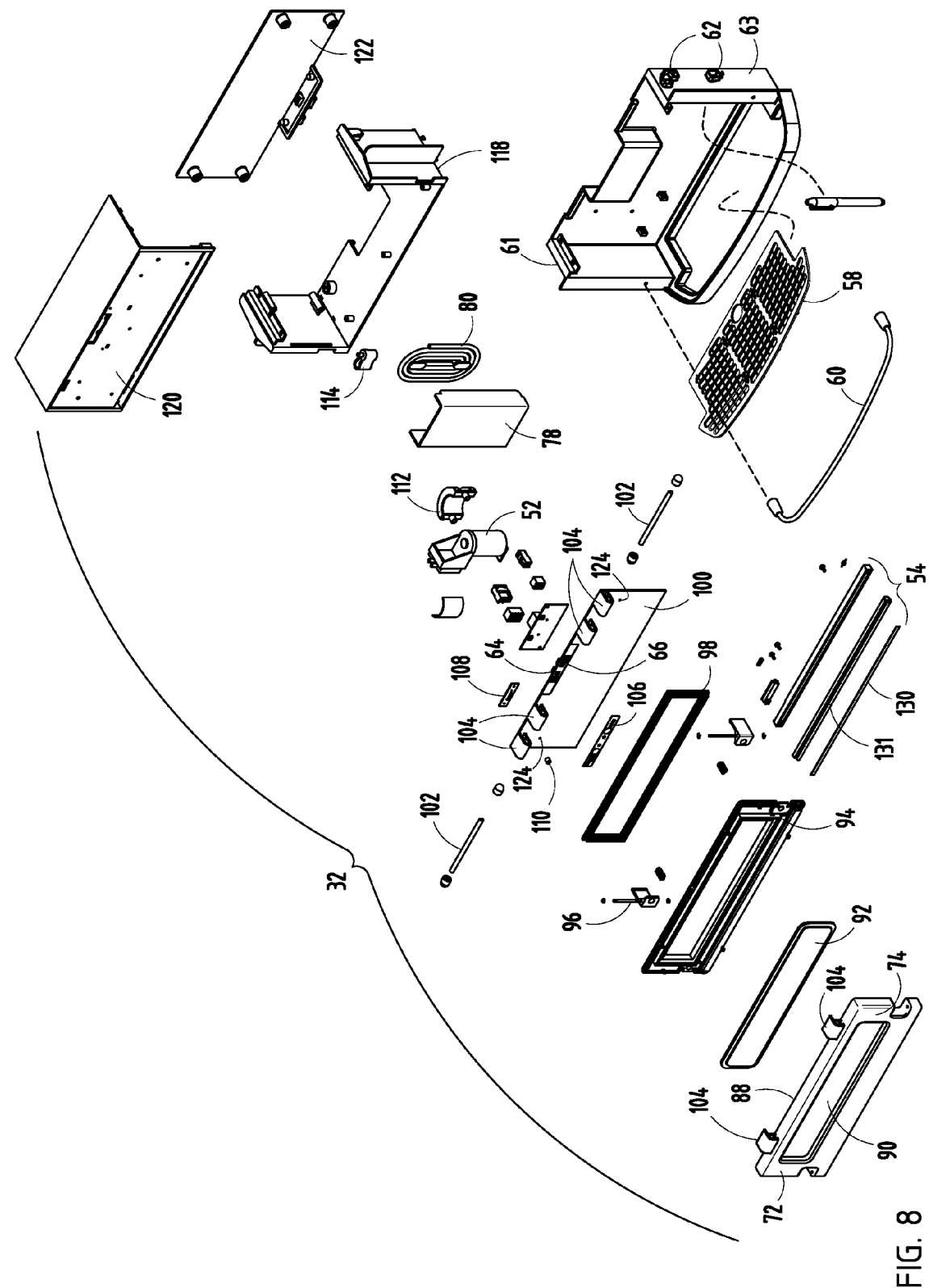
FIG. 8 is a top perspective exploded view of the food preservation system of FIG. 2.

The reference numeral 20 shown in FIGS. 1 and 1A generally designates a refrigerator having a cabinet 22 defining an open storage space 24 and including a door 26 with an exterior side 28 and an interior side 30 adapted to receive a modular component 32 which is a food preservation system in the illustrated embodiment. The modular component 32 includes a base 34 removably connected to the interior side 30 of the door 26 and has a first edge 36 and a second edge 38. A component door 40 is hingedly-connected to the first edge 36 of the base 34. The component door 40 is operable between an open position 42 (FIG. 9) and a closed position 44. The base 34 and component door 40 define a sealed compartment 46 when the component door 40 is in the closed position 44. First fasteners 48 are disposed on the component door 40, and second fasteners 50 (FIG. 5) are disposed on the base 34 and adapted to engage with the first fasteners 48 to create an airtight seal between the component door 40 and the base 34. Referring to FIG. 8, a vacuum device 52 is in communication with the sealed compartment 46 and a heat sealer 54 is disposed on one of the base 34 and the component door 40.

Referring again to FIG. 1, the refrigerator 20 may include side-by-side door configuration or upper and lower door configurations that provide for both a storage space for refrigerating food goods and a storage space for freezing food goods. It will be understood that the food preservation system of the present invention could be incorporated into the refrigeration storage space or the freezer storage space. A roll of bags 55 or sealing material is disposed below the modular component 32, although it is contemplated that the roll 55 could be positioned elsewhere in the refrigerator 20. The roll 55 could also be left out of the refrigerator 20 to conserve space. As shown in FIG. 1A, the modularity of the modular component 32 allows for the complete removal of the modular component 32 from the refrigerator 20. The modular component 32 includes all of the necessary devices to operate but requires a power source 56 to function. The power source 56 can come from the refrigerator 20 itself or from a nearby power outlet. It is also contemplated that the modular component 32 could be powered by a battery source disposed in the modular component 32. Although the illustrated embodiment shows a food preservation system as the modular component 32, it is contemplated that other systems could be used such as a modified atmosphere system.

In one embodiment, a countertop support receives the modular component 32. The countertop support includes a power cord that connects with the power source 56. The countertop also includes a power relay connector that contacts a power port 82 (FIG. 4) thereby providing power to the modular component 32.

Figure 12:
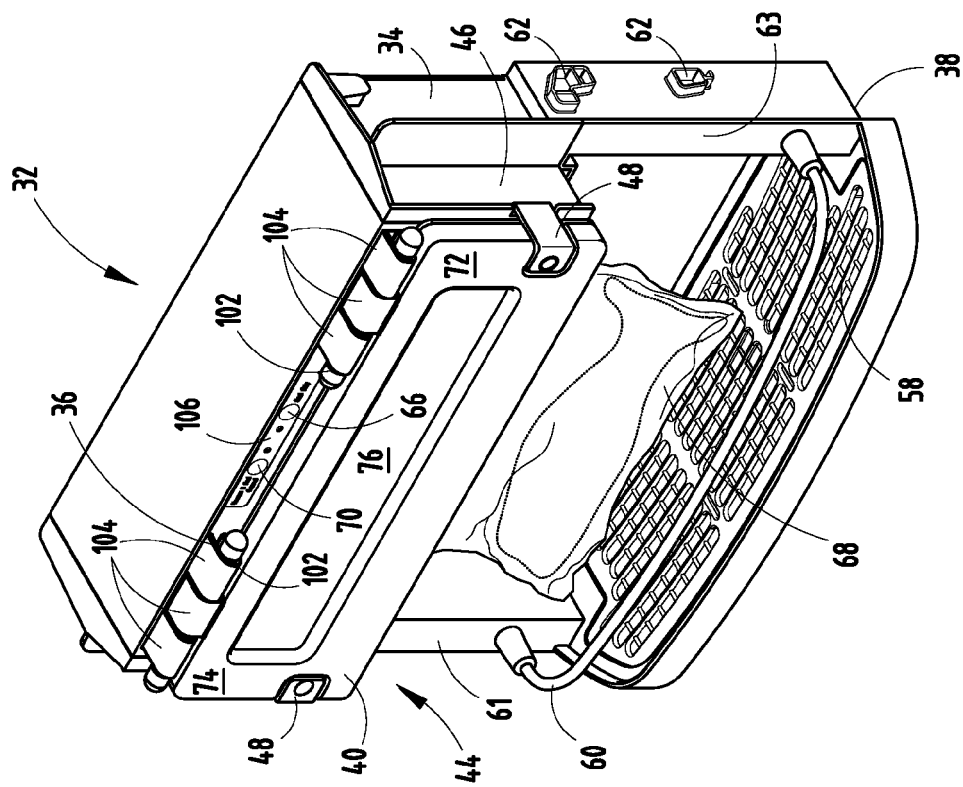
FIG. 12 is a top perspective view of a sealable bag being sealed.
Figure 11:
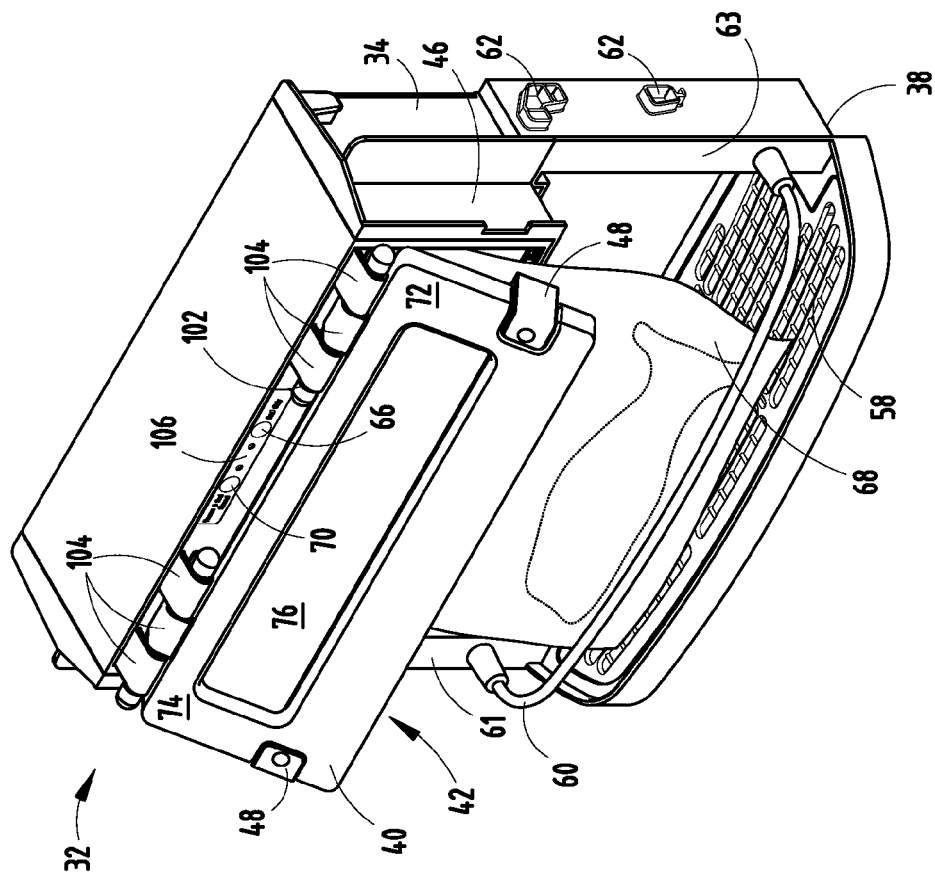
FIG. 11 is a top perspective view of the food preservation system prior to sealing a sealable bag.
Figure 13:
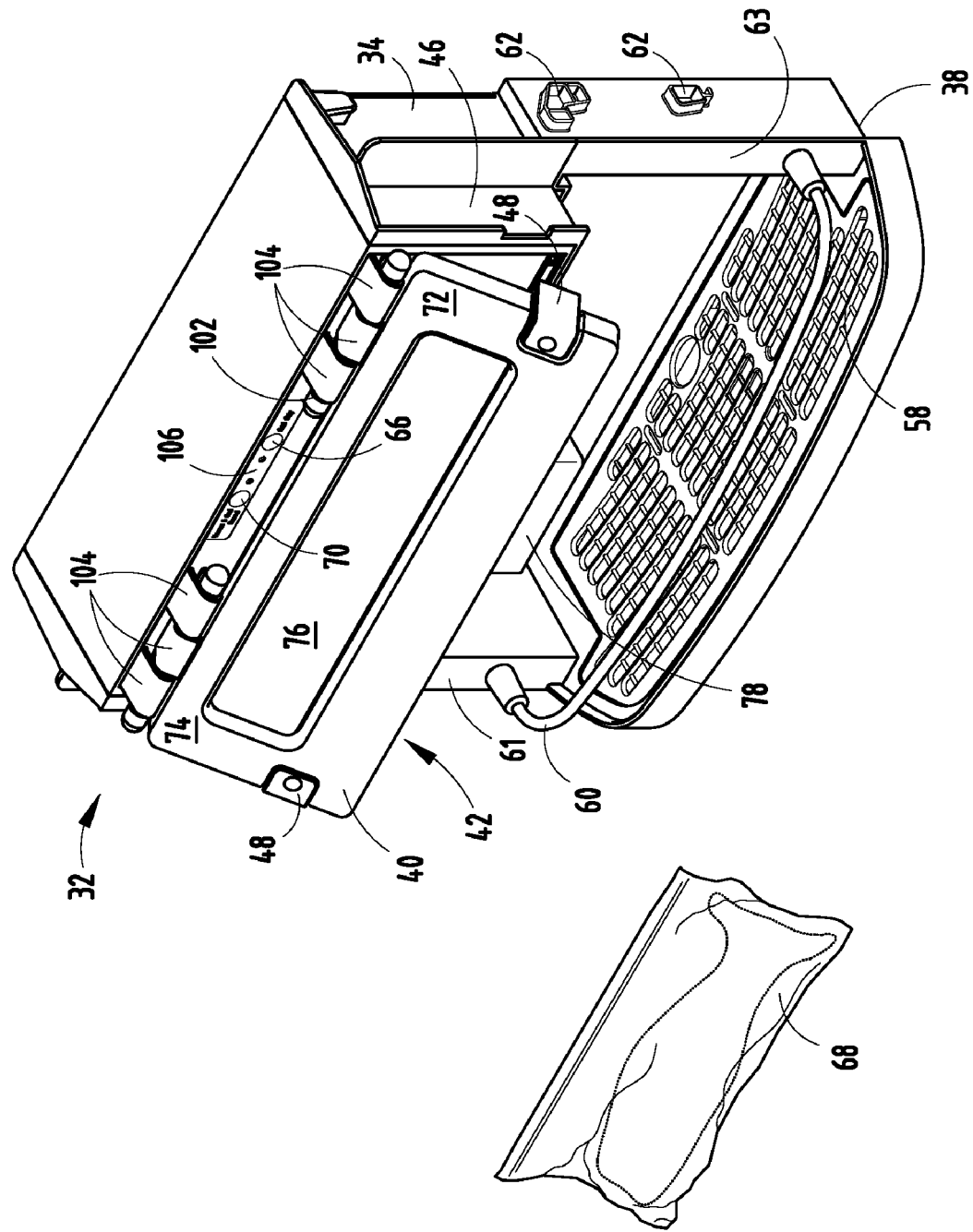
FIG. 13 is a top perspective view of the food preservation system after the sealable bag has been sealed.

Referring now to FIGS. 2-4, the food preservation system includes a grate 58 adapted to support a bag of food goods. A base rail 60 extends across the modular component 32 adjacent the second edge 38 of the base 34. The base rail 60 helps secure a bag of food goods on the grate 58. First and second sides 61, 63 of the base 34 include protrusions 62 adapted to be received in the interior side 30 of the door 26 to support the modular component 32 on the door 26. Modular component controls 64 (FIG. 8) that activate and deactivate the modular component 32 are disposed on the first edge 36 of the base 34. A seal control 66 operates to seal a sealable bag 68 (FIGS. 11-13). A vacuum and seal control 70 operates to remove the air from a bag 68 and after reaching a predetermined negative pressure level operates to seal the bag 68 in a vacuumed state. The first and second fasteners 48, 50 are disposed on first and second sides 72, 74 of the component door 40 and allow the component door 40 to be temporarily sealed against the base 34. The component door 40 and base 34 define a sealed compartment 46 when the component door 40 is in the closed position 44, as will be disclosed in further detail below.

Referring again to FIGS. 2 and 4, the component door 40 includes a viewing area 76 that may be translucent or transparent. The viewing area 76 allows the user to see the edge of the bag 68 that is being sealed and make sure that the bag 68 is in proper alignment with the sealed compartment 46 and heat sealer 54. A hose cover 78 is disposed below the heat sealer 54 and covers an elongate suction hose 80 as described in further detail below. The power port 82 of the modular component 32 is designed to interface with a power relay 84 that extends from the interior side 30 of the door 26. The power port 82 engages when the modular component 32 is secured to the interior side 30 of the door 26. Housing panels 86 are disposed above and below the power port 82 and allow access to interior components of the modular component 32 if devices inside the modular component 32 need to be repaired or replaced.

Referring now to FIG. 8, the component door 40 of the modular component 32 includes a component door front 88 with an aperture 90 designed to receive a window 92 that defines the viewing area 76. As mentioned above, the viewing area 76 generally includes a translucent or transparent pane of material that allows a user to view the open end of the bag 68. A component door back 94 is fastened to the component door front 88 and secures the window 92 between the component door front 88 and the component door back 94. It is contemplated that the window 92 could be constructed from glass, plastic, fiberglass or any other material that allows adequate light to pass through the window 92 and allows a user to see into the sealed compartment 46 when the component door 40 is in the closed position 44. The first and second fasteners 48, 50 form a latching mechanism and are moveable into and out of secure engagement with the base 34. The fasteners 48, 50 are held in place by fastener rods 96 secured to the base 34. A gasket 98 is disposed between the component door 40 and an upper housing cover 100. Door hinge rods 102 extend through hinges 104 on the upper housing cover 100 and the component door front 88 to allow rotational movement of the component door 40 relevant to the upper housing cover 100. It is also contemplated that the fasteners 48, 50 can be magnetic fasteners. In this instance, the magnetic fasteners 48, 50 have opposite magnetic fields and are therefore attracted to one another thereby keeping the component door 40 in the closed position. Alternatively, the fastener 48 may be magnetized and the other fastener 50 may be a metal attracted to the magnetized fastener 48. Similarly, fastener 50 may be magnetized and attracted to metallic fastener 48.

Referring to FIGS. 2 and 8, when the component door 40 is in the closed position 44, an airtight seal is formed between the component door 40, the gasket 98, and the upper housing cover 100 to form the sealed compartment 46. An overlay 106 that indicates the function of the modular component controls 64 on the upper housing cover 100 is provided so that the user knows whether the vacuum and seal control 70 has been activated or the seal control 66 has been activated. Alternatively, the modular component 32 may include a digital display with information relating to the vacuuming and sealing functions. A magnetic sensor 108 is disposed on the upper housing cover 100, which senses a magnet 110 disposed on an upper portion of the component door 40. When the component door 40 is in the closed position 44, the magnet 110 on the component door 40 engages the magnetic sensor 108. The magnetic sensor 108 then sends a signal to the modular component controls 64 indicating that power to the vacuum device 52 or to the heat sealer 54 should be made available. If the component door 40 is open, then the magnet 110 on the component door 40 does not contact the magnetic sensor 108 and power to the heat sealer 54 and to the vacuum device 52 is not available. The vacuum device 52 is disposed behind the upper housing cover 100 and is secured to the upper housing cover 100 by a vacuum pump clamp 112. A hose port 114 connects the suction hose 80 to the sealed compartment 46 and the cover 78 extends over the hose 80. The vacuum device 52 is secured inside a main vacuum housing 118 between a front vacuum housing 120 and a back cover 122. The main vacuum housing 118 rests over the base 34. Vacuum ports 124 are located in the housing cover 100 and when the vacuum device 52 is activated air is evacuated from the sealed compartment 46 through the vacuum ports 124.

Figure 10:
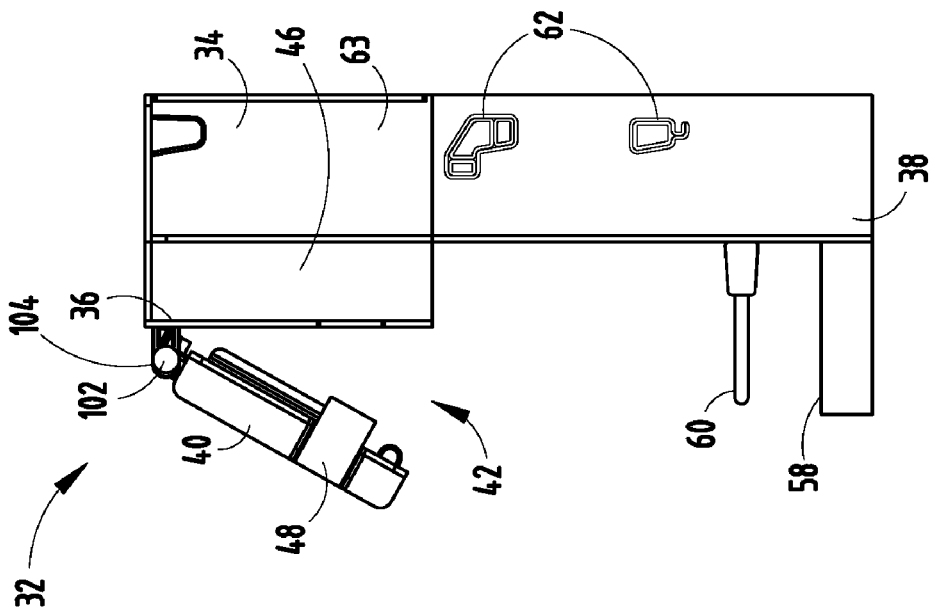
FIG. 10 is a side elevational view of the food preservation system of FIG. 2 with the sealing door partially open.
Figure 9:
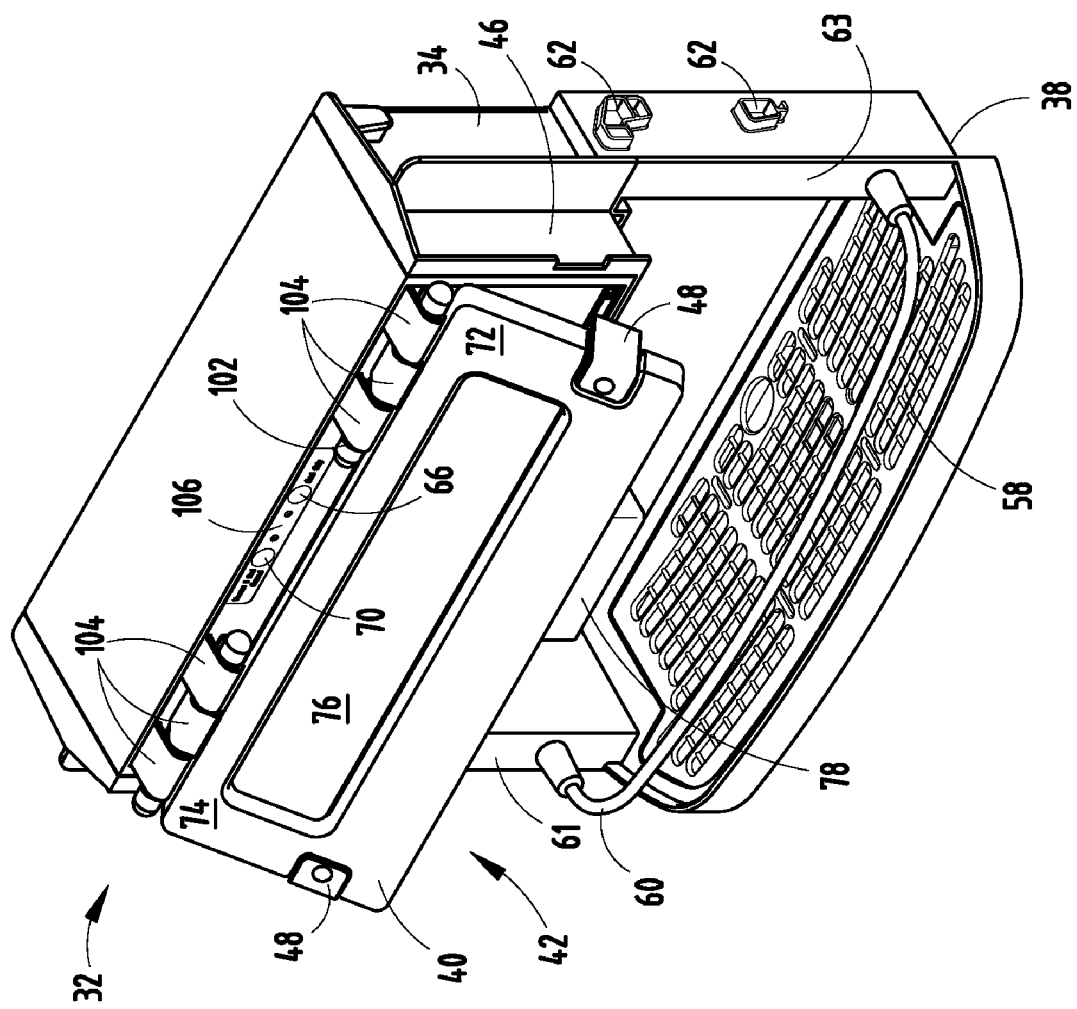
FIG. 9 is a top perspective view of the food preservation system of FIG. 2 with the sealing door partially open.

Referring now to FIGS. 9 and 10, the component door 40 is rotatable about hinges 104 on the first edge 36 of the base 34. When the component door 40 is opened, a sealable bag 68 may be positioned with the open end between the component door 40 and the base 34. A bottom portion of the bag 68 is positioned on the grate 58 and held in place by the base rail 60 (FIG. 11). The component door 40 is then closed against the base 34 and the bag 68 is either sealed or vacuumed and sealed (FIG. 12). After the bag 68 has been vacuumed and the inside of the bag 68 has reached a predetermined negative pressure, the heat sealer 54 is activated. The heat sealer 54 includes a sealing plate 130 that rests against a bumper 131 when the component door 40 is in the closed position 44. The sealing plate 130 rises in temperature and consequently melts a portion of the bag 68 thereby melting two walls of the sealable bag 68 together. The sealing plate 130 may be disposed on the component door 40 in which case the bumper 131 is on the base 34 opposite the sealing plate 130. Alternatively, the sealing plate 130 may be disposed on the base 34, in which case the bumper 131 is on the component door 40 opposite the sealing plate 130. After the bag 68 has been sealed, the bag 68 is removed and the contents therein can be refrigerated or frozen. The modular component 32 is then ready to seal another sealable bag 68.

Figure 14:
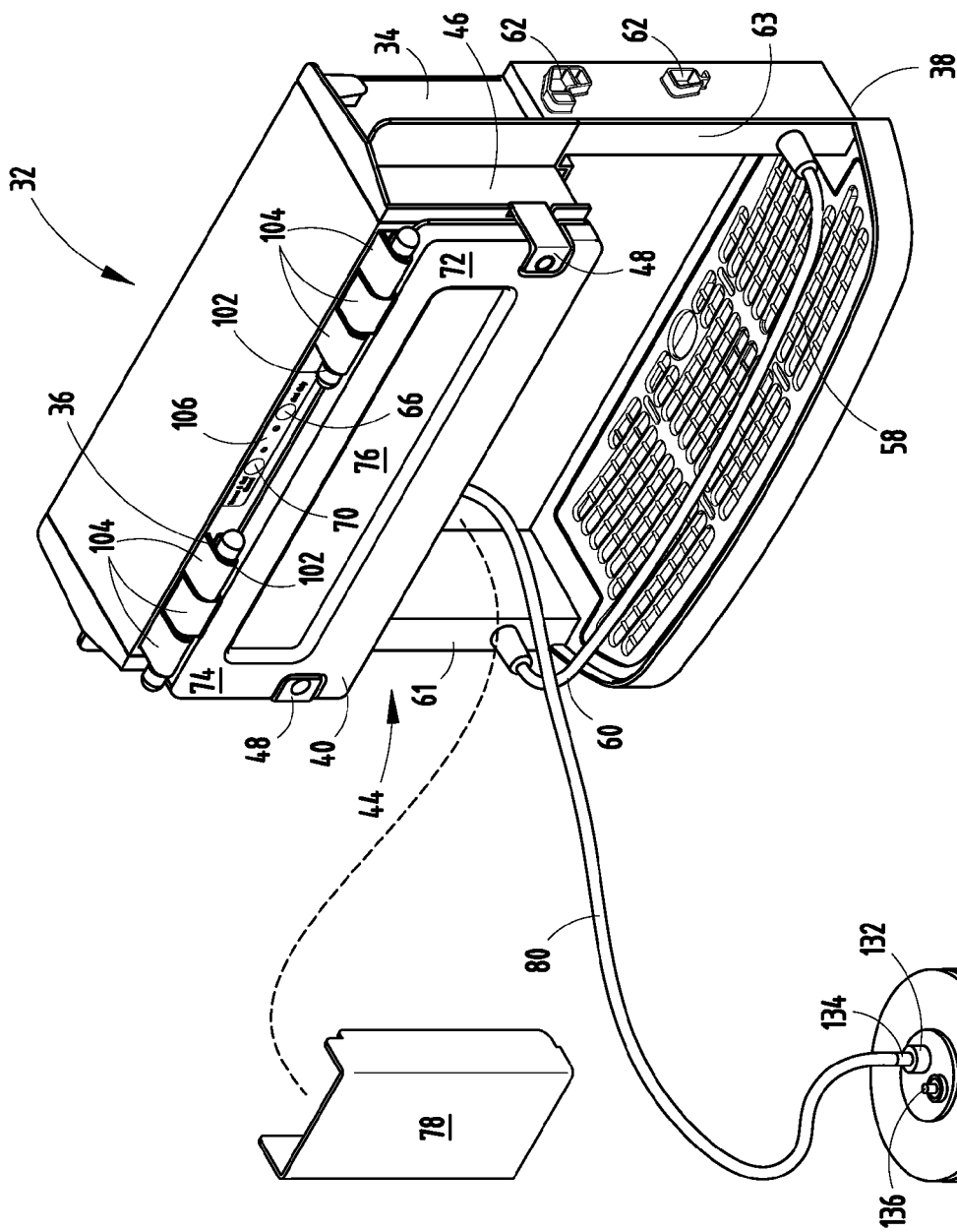
FIG. 14 is a top perspective view of the food preservation system with the suction hose deployed and vacuuming a hard container.
Figure 15:
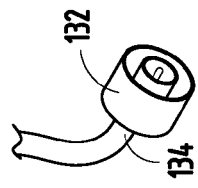
FIG. 15 is an enlarged top perspective view of a distal end of the suction hose.

Referring now to FIGS. 14 and 15, the suction hose 80 is stored behind the suction hose cover 78. The suction hose 80 is connected with the sealed compartment 46 such that when the vacuum device 52 is actuated and evacuates air through the vacuum ports 124 from the sealed compartment 46, thus depressurizing the sealed compartment 46, the suction hose 80 is also depressurized. The suction hose 80 includes a check valve 132 that prohibits air from entering the hose 80 from a distal end 134 of the hose 80 unless engaged with a valve stem 136 in a valve of a bag or hard container 140, as shown in FIG. 14. In this instance, the hose 80 is connected with the hard plastic container 140 and the vacuum device 52 is activated to draw air from the sealed compartment 46 and from the suction hose 80 which consequently draws air from the hard container 140 when the check valve 132 has been opened by way of the complementary valve stem 136 in the hard container 140. It is contemplated that any form of valve assembly as understood by those having skill in the art could be used to facilitate air removal via the hose 80 from the bag or hard container 140.

A method of making a vacuum sealing component 32 for vacuum sealing food goods or other items generally includes providing a refrigerator 20 having module receiving connectors 62 on an interior portion 30 of the refrigerator 20. A modular vacuum sealer 32 is provided with a base 34. The base 34 of the modular vacuum sealer 32 is removably connected to the module receiving connectors 62 of the refrigerator 20. A component door 40 is hingedly connected to the base 34. The component door 40 is operable between an open position 42 and a closed position 44. The base 34 and the component door 40 define a sealed compartment 46 when the component door 40 is in the closed position 44. The vacuum device 52 is connected with the sealed compartment 46 formed when the component door 40 is in the closed position 44. The heat sealer 54 is connected to one of the component door 40 and the base 34. A bumper 131 is connected to the other of the component door 40 and the base 34 opposite the heat sealer 54.

The above description is considered that of the preferred embodiments only. Modifications of the invention will occur to those skilled in the art and to those who make or use the invention. Therefore, it is understood that the embodiments shown in the drawings and described above is merely for illustrative purposes and not intended to limit the scope of the invention, which is defined by the following claims as interpreted according to the principles of patent law, including the Doctrine of Equivalents.

The invention claimed is:

1. A refrigerator comprising:
 a cabinet defining an open storage space and including a door with an exterior side and an interior side supporting a modular component, the modular component including:
  a base removably connected to the interior side of the door and having a first edge and a second edge;
  a component door hingedly-connected to the first edge of the base, wherein the component door is operable between an open position and a closed position and wherein the base and component door define a sealed compartment when the component door is in the closed position;
  first fasteners disposed on the component door;
  second fasteners disposed on the base and adapted to engage with the first fasteners to create an airtight seal between the component door and the base;
  a vacuum device in communication with the sealed compartment; and
  a heat sealer disposed on one of the base and the component door.

2. The refrigerator of claim 1, wherein the component door includes a frame with an inner portion that is at least partially translucent.

3. The refrigerator of claim 1, wherein one of the first and second fasteners is magnetized.

4. The refrigerator of claim 3, wherein the modular component is removable from the refrigerator and wherein one of the first and second fasteners includes a latching mechanism.

5. The refrigerator of claim 3, wherein one of the first and second fasteners is disposed adjacent to and on either end of the heat sealer.

6. The refrigerator of claim 5, further comprising:
 vacuum ports that connect the sealed compartment with the vacuum device.

7. The refrigerator of claim 6, further comprising:
 a suction hose in communication with the sealed compartment and extending therefrom.

8. The refrigerator of claim 7, further comprising:
 a check valve disposed on a distal end of the suction hose.

9. The refrigerator of claim 1, further comprising:
 a bag holder adjacent the modular component.

10. The refrigerator of claim 1, further comprising:
 a heat seal bumper disposed on the other of the base and the component door opposite the heat sealer.

11. The refrigerator of claim 1, further comprising:
 a bag holder disposed adjacent the vacuum device.

12. The refrigerator of claim 9, wherein the bag holder includes a support grate for supporting a bag of food goods and a base rail proximate the support grate that helps maintain the bag of food goods on the support grate.

13. The refrigerator of claim 1, wherein first and second sides of the base include protrusions adapted to be received in the interior side of the component door to support the modular component on the component door.

14. The refrigerator of claim 1, further comprising:
a roll of sealable bags disposed on the interior side of the component door proximate the modular component.

15. The refrigerator of claim 1, further comprising:
a power port disposed on the modular component, which is designed to interface with a power relay on the interior side of the component door.

16. The refrigerator of claim 7, further comprising:
a hose cover adapted to hide the suction hose when the suction hose is in a stored position.

17. The refrigerator of claim 7, further comprising:
a hose port that connects the suction hose to the sealed compartment.

18. The refrigerator of claim 1, further comprising:
a sensor that senses when the component door is in the closed position.

* * * * *